Figure 1:
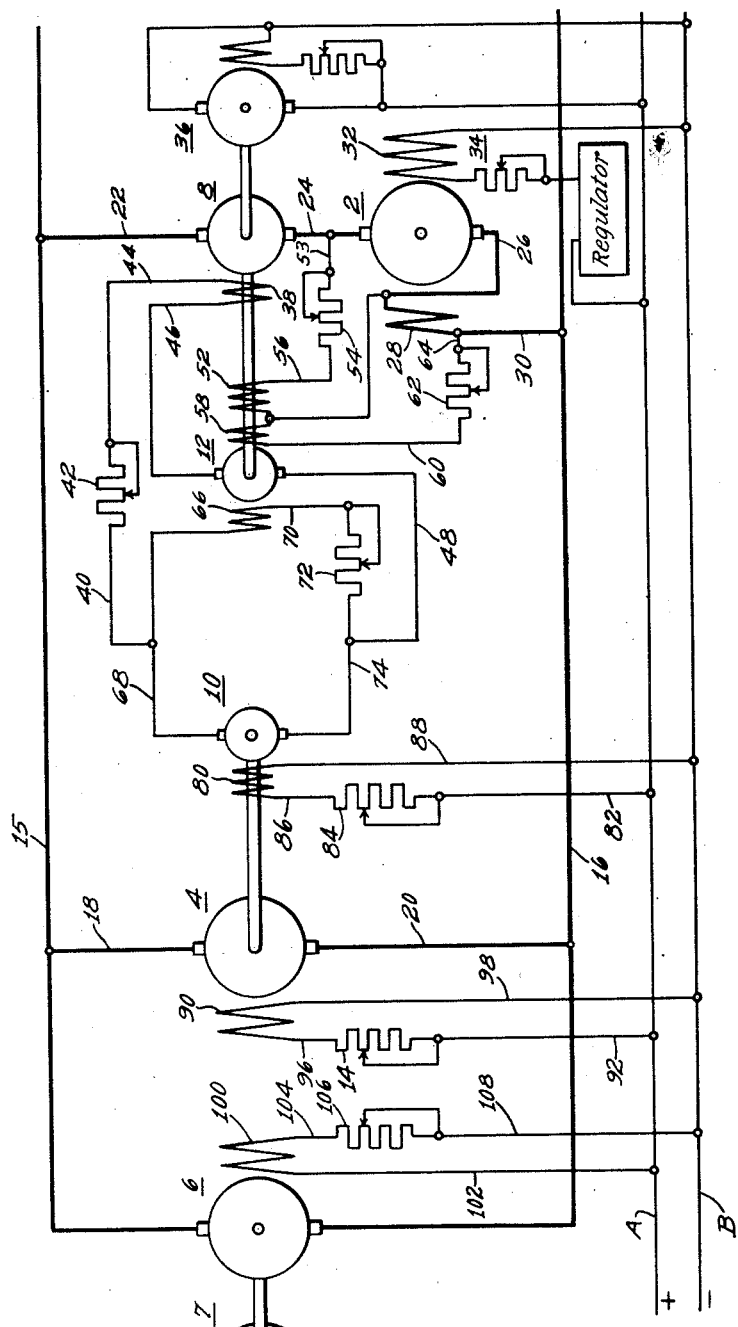

June 2, 1942.  W. G. COOK  2,284,802

CONTROL SYSTEM

Filed Jan. 29, 1941  2 Sheets-Sheet 1

WITNESSES:

INVENTOR
Willard G. Cook.
BY
ATTORNEY

June 2, 1942.  W. G. COOK  2,284,802
CONTROL SYSTEM
Filed Jan. 29, 1941  2 Sheets-Sheet 2

WITNESSES:

INVENTOR
Willard G. Cook.
BY
ATTORNEY

Patented June 2, 1942

2,284,802

UNITED STATES PATENT OFFICE 2,284,802

CONTROL SYSTEM

Willard G. Cook, Wilkinsburg, Pa., assignor to Westinghouse Electric & Manufacturing Company, East Pittsburgh, Pa., a corporation of Pennsylvania Application January 29, 1941, Serial No. 376,415

19 Claims. (Cl. 172—239)

My invention relates to control systems, generally, and more particularly to control systems for automatically maintaining the desired speed and voltage relations between associated dynamo-electric machines.

In the operation of steel strip rolling mills, it is customary to associate a dynamo-electric machine with each of the strip reels and to cause the dynamo-electric machine associated with the winding reel to operate as a motor to drive the reel. The dynamo-electric machine associated with the unwinding reel is made to function as a braking generator to provide back tension on the strip.

It is also common practice to provide booster generators in series circuit relation with the dynamo-electric machines to extend the speed range of the dynamo-electric machines beyond the speed ranges that are possible with field control alone. The use of such dynamo-electric machines and associated booster generators is shown and described in the patent to A. F. Kenyon, No. 2,214,617, issued September 10, 1940, and reference is made thereto for a full description of their cooperative functioning.

With the mill motor, reel motor and booster generator connected as shown and described in the Kenyon Patent No. 2,214,617, the armature potential of the reel motor will be equal to the sum of the potentials of the main and booster generators. The armature potential of the mill motor will be equal to the main generator potential and the excitation of the booster generator will be proportional to the main generator potential. There will, therefore, be a definite proportion between armature potentials of the mill and reel motors and the speeds of these motors will bear a definite ratio, all other conditions remaining constant.

It has been found, however, that the desired speed ratio is not maintained during speed changes by armature voltage control due to the time lag in the booster field. Because of this time lag, the booster voltage does not change as rapidly as the main generator voltage and the ratio between the mill motor and reel motor armature voltages is changed, resulting in a change of the ratio of their speeds. This failure to maintain the desired speed ratio between the mill and reel motors is more pronounced at the higher rates of acceleration and deceleration of the mill and, therefore, constitutes a serious limitation upon the rate of acceleration and deceleration of the mill.

An object of my invention is to provide a control system for associated dynamo-electric machines which shall function to maintain any desired ratio between the speeds of the machines during periods of acceleration, deceleration, and while running at substantially constant speed.

Another object of the invention is to provide a control system for a dynamo-electric machine and a booster generator associated therewith which shall function to control the booster generator potential in response to the variation of the armature potential of the dynamo-electric machine from a predetermined potential.

A further object of the invention is to provide a control system for a plurality of associated dynamo-electric machines and a booster generator associated with one of the machines which shall function to so control the booster generator as to enable it to cause the speed of its associated machine to bear a predetermined ratio to the speed of other of the machines.

Another object of the invention is to provide a control system for a direct current motor which shall function to compensate for the effect of the IR drop in the motor armature upon the speed regulation of the motor.

Figure 2:
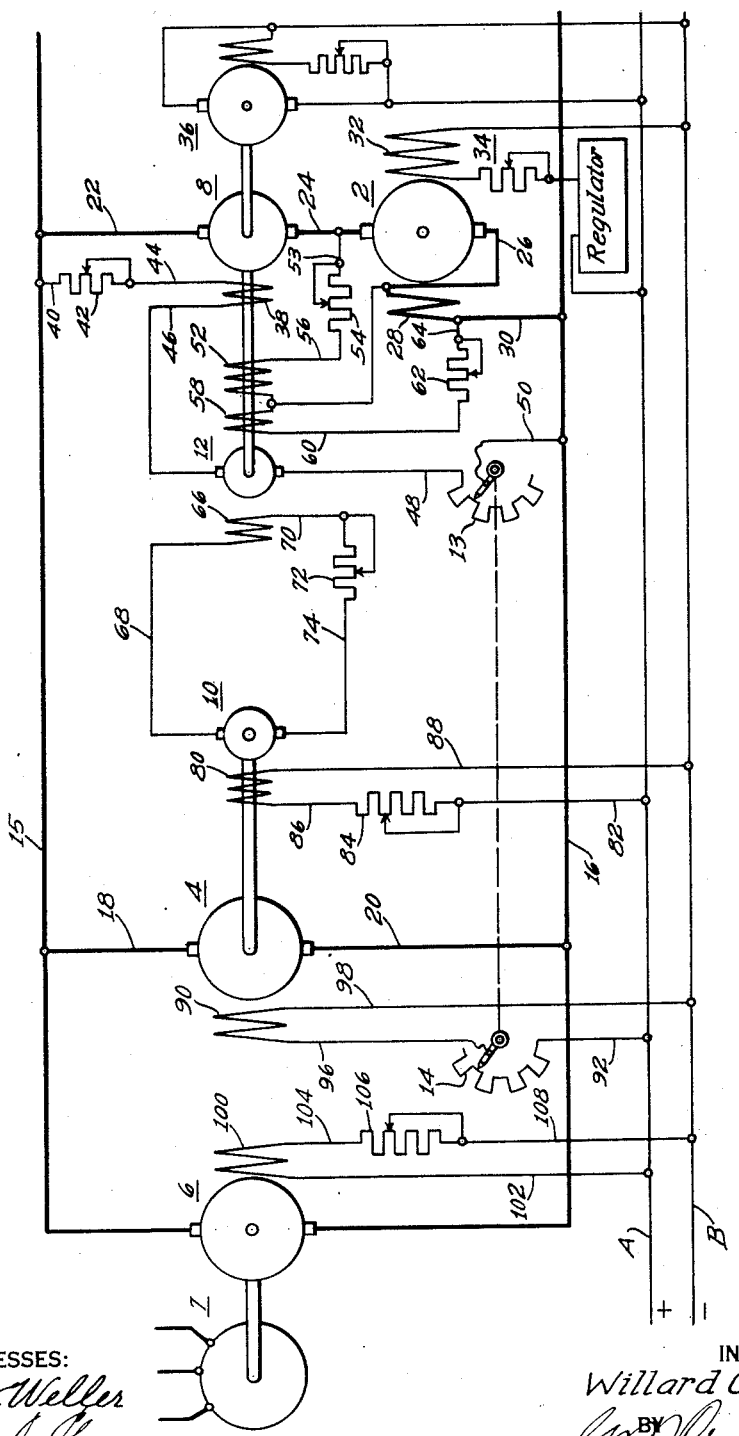

These and other objects and advantages of the invention will be apparent from the following detailed description taken in connection with the accompanying drawings in which like reference characters in the two figures designate identical or similar elements, and in which:

Figure 1 is a diagram of a control system for associated motors embodying the principal features of the invention; and Fig. 2 is a control diagram of another embodiment of the invention.

Referring to Fig. 1 of the drawings, a mill motor 2 and a reel motor 4 are connected to be energized by a main generator 6. A booster generator 8 is connected in series circuit relation with the armature of the reel motor 2 and is excited by a pilot generator 10 in series circuit relation with a forcing generator 12. The forcing generator 12 is excited in accordance with the speed of the mill motor 4 as measured by the pilot generator 10 and in accordance with the armature potential and the armature current of the reel motor 2.

The embodiment of the invention shown in Fig. 2 differs from that of Fig. 1 in that the series circuit including the field winding of the booster generator 8 and the forcing generator 12 is energized by the main generator 6 in series circuit with a variable resistor 13 which is selectively actuable simultaneously with a variable resistor 14 in the circuit of the field winding of the motor 4.

Referring to Fig. 1 of the drawings for a more detailed description of the invention, the main generator 6 may be continuously driven by any suitable means, such as an induction motor 7, and has its armature connected to power conductors 15 and 16. The motor 4 is connected to the power conductors 15 and 16 by the conductors 18 and 20, respectively. The motor 2 is connected to the power conductors 15 and 16 in a circuit which extends from the conductor 15 through a conductor 22, the armature of the booster generator 8, a conductor 24, the armature of the motor 2, a conductor 26, a series field winding 28 of the motor 2 and a conductor 30 to the conductor 16. The motor 2 is also provided with a main field winding 32 which is energized from any suitable source of direct current power connected to the conductors A and B and is connected with a regulator, as indicated.

The booster generator 8 and the forcing generator 12 are continuously driven at a substantially constant speed by any suitable means, such as a motor 36, which is connected to be energized from the conductors A and B, as indicated. The booster generator 8 has a field winding 38 which is connected to be energized by the pilot generator 10 and the forcing generator 12 in a circuit which extends from one terminal of the armature of the pilot generator 10 through conductors 68 and 40, a variable resistor 42, a conductor 44, the field winding 38 of the booster generator 8, a conductor 46, the armature of the forcing generator 12, and conductors 48 and 74 to the other terminal of the armature of the pilot generator 10.

The forcing generator 12 is provided with a field winding 52 which is energized in accordance with the potential acting across the armature of the motor 2 in a circuit which extends from one terminal of the armature of the motor 2 through the conductors 24 and 53, a variable resistor 54, a conductor 56, the field winding 52 and a conductor 26 to the other terminal of the armature of the motor 2. A second field winding 58 is provided for the forcing generator 12 connected in aiding relation with the field winding 52 and energized in accordance with the armature current of the motor 2 in a circuit which extends from one terminal of the series field winding 28 through the conductor 26, the field winding 58, a conductor 60, a variable resistor 62, and a conductor 64 to the other terminal of the series field winding 28 of the motor 2. The forcing generator 12 is provided with a third field winding 66 connected in opposing relation with the field windings 52 and 58, and energized by the pilot generator 10 in a circuit which extends from one terminal of the armature of the pilot generator 10 through the conductor 68, the field winding 66, a conductor 70, a variable resistor 72 and a conductor 74 to the other terminal of the armature of the pilot generator 10.

The pilot generator 10 is continuously driven by the motor 4 and is excited by a field winding 80 which is energized from the conductors A and B in a circuit which extends from the conductor A through a conductor 82, a variable resistor 84, a conductor 86, the field winding 88 and a conductor 88 to the conductor B.

The motor 4 is provided with a field winding 90 which is connected to be energized from the conductors A and B through a circuit which extends from the conductor A through a conductor 92, the variable resistor 14, a conductor 96, the field winding 90, and a conductor 98 to the conductor B.

The main generator 6 is provided with a field winding 100 which is energized from the conductors A and B in a circuit which extends from the conductor A through a conductor 102, the field winding 100, a conductor 104, a variable resistor 106 and a conductor 108 to the conductor B.

The principles of the invention have been illustrated herein and will be described as applying to elements of a strip steel rolling mill similar to those described in the hereinbefore referred to Kenyon Patent No. 2,214,617 and the main generator 6, the motor 4, the motor 2, and the booster generator 8 of the present invention will be understood to be analogous to the main generator 8, the mill motor 3, the reel motor 6 and the booster generator 102, of the Kenyon patent. Following out the analogy, the regulator indicated in the drawings corresponds to and performs the same function as the regulator 15 in the Kenyon patent and its function is to so control the excitation of the reel motor 2 in response to the armature current of the reel motor 2 as to maintain a substantially constant armature current and thus a constant strip tension as the strip is wound on the reel.

In the operation of the system it will be seen that the speed of the mill motor 4 may be varied by varying the excitation of the main generator 6 by means of the variable resistor 106 to thus vary the output potential of the generator 6 and vary the potential acting upon the armature of the mill motor 4. At the same time, the speed of the reel motor 2 will be changed by the variation of the potential between the conductors 15 and 16. Simultaneously with the change of speed of the mill motor 4, the output potential of the pilot generator 10 will vary proportionately with the change in speed of the mill motor 4 and this will change the excitation of the booster generator 8 to maintain the same proportion between the speed of the mill motor 4 and the potential applied to the armature of the reel motor 2. However, it has been found that there is a time lag between the change of speed of the mill motor 4 and the change of potential of the booster 8 due to the inductance of the field winding 38 of the booster generator 8. It will be seen that during periods of acceleration or deceleration of the mill, the desired proportion between the speeds of the mill motor 4 and the reel motor 2 will not be properly maintained because of this failure of the potential of the booster generator 8 to keep in step with the change in speed of the mill motor 4.

The forcing generator 12 is provided to apply an added potential to the field winding 38 of the booster generator 8 proportional to the difference of the speed of the mill motor 4 and the armature potential applied to the reel motor 2. To perform this function, when the mill is operating at a constant speed, the excitation provided by the field windings 52, 58 and 66 for the forcing generator 12 will substantially nullify each other and there will be no potential generated by the forcing generator 12. When a change in speed of the mill motor 4 occurs, the failure of the booster generator 8 to change its potential in step with the change in speed of the mill motor 4 will cause an unbalance between the proportion of opposing excitations of the forcing generator 12 and this unbalance will provide a net excitation for the forcing generator 12 which will affect the field winding 38 of the booster generator 8 in such a manner as to force it to more quickly change to the excitation necessary to cause the booster generator 8 to provide the necessary potential to provide the desired ratio between the speed of the mill motor 4 and the armature potential of the reel motor 2.

Thus when there is an increase in the speed of the mill motor 4 due to either a change in its excitation or a change in the armature potential applied thereto by the main generator 6, the potential applied to the field winding 38 of the booster generator 8 will be increased by the increase in speed of the pilot generator 10 in proportion to the increase in speed of the mill motor 4 and in addition the change in the excitation of the forcing generator 12 will add an additional potential to the field winding 38 of the booster generator 8 to more quickly increase the excitation of the booster generator 8.

The field winding 58 of the forcing generator 12 is provided to compensate for the IR drop in the armature of the reel motor 2, to thereby cause the booster generator 8 to provide an added potential to the potential acting upon the armature of the reel motor 2 equal to the IR drop in the armature to thereby more nearly maintain the desired proportion between the speed of the mill motor 4 and the armature potential of the reel motor 2. The variable resistors 42, 54, 62 and 72 are provided for making any desired adjustments in the values of the currents in the circuit in which they are connected to provide the desired proportion of excitations for the booster generator 8 and the forcing generator 12.

It is to be understood that the reel motor 2 may be a dynamo-electric machine which will act as a motor to drive a winding reel or as a braking generator to provide a load on an unwinding reel, depending upon the direction of pass of the strip through the mill just as in the Kenyon patent hereinbefore referred to, the reel motors 6 and 7 alternately act as braking generators and as reel driving motors as fully explained in the Kenyon patent. With the dynamo-electric machine 2 acting as a braking generator whenever a change in draft is made, it will be necessary to change the relation between the speeds of the mill motor 4 and the armature potential of the dynamo-electric machine 2 and this may be done by adjusting the variable resistor 72 to provide the proper excitation for the forcing generator 12.

In the embodiment of the invention shown in Fig. 2, the relations between the several elements of the combination are substantially the same as in the embodiment of Fig. 1, with the exception that the series circuit including the forcing generator 12 and the field winding 38 of the booster generator 8 is energized from the main generator 6 in a circuit which extends from the conductor 15 through the conductor 40, a variable resistor 42, the conductor 44, the field winding 38, the conductor 46, the armature of the forcing generator 12, the conductor 48, the variable resistor 13 and a conductor 50 to the conductor 16. In this embodiment of the invention, the variable resistor 13 and the variable resistor 14 are mechanically tied together for simultaneous operation so that when the speed of the mill motor 4 is varied by the field control by operating the variable resistor 14, there will be a corresponding change in the excitation of the booster generator 8 by actuation of the variable resistor 13. Thus, as the speed of the mill motor 4 is increased by increasing the effective resistance of the variable resistor 14 to thus decrease the excitation of the mill motor 4, the effective resistance of the variable resistor 13 will be decreased to increase the excitation and, therefore, the output potential of the booster generator 8 to thus tend to increase the armature potential of the mill motor 2. The functioning of the forcing generator 12 in response to speed changes of the mill motor 4 to force the excitation of the booster generator 8 in response to changes in speed of the mill motor 4 will function in the same manner as described in connection with the embodiment of the invention of Fig. 1.

Thus it will be seen that I have provided a control system for a plurality of associated dynamo-electric machines and a booster generator associated with one of the machines which shall function to so control the booster generator as to enable it to cause the speed of its associated machine to bear a predetermined ratio to the speed of the other machines and which shall function to compensate for the effect of the IR drop in the motor armature of one of the machines upon the speed regulation of the machine.

In compliance with the requirements of the patent statutes, I have shown and described herein the preferred embodiments of my invention. It is to be understood, however, that the invention is not limited to the precise constructions shown and described but is capable of modification by one skilled in the art, the embodiments herein shown being merely illustrative of the principles of my invention.

I claim as my invention:

1. In a control system for a pair of motors, a source of power for the motors, means connecting one of the motors to the source of power, a booster generator, means connecting the other of the pair of motors to the source of power in series circuit relation with the booster generator, means connecting the booster generator to be excited by the said source of power, means for generating a potential which is a function of the speed of said one motor, and means for varying the excitation of said booster generator in accordance with the differential between said potential which is a function of the speed of said one motor and the potential drop across the armature of said other motor.

2. In a control system for a dynamo-electric machine and a motor which is energized by a source of power of selectively variable potential, in combination, a booster generator, means connecting the dynamo-electric machine and the booster generator in series circuit relation to the source of power, a forcing generator, means connecting the forcing generator and the field winding of the booster generator to the source of power in series circuit relation, and means providing excitation of the forcing generator proportional to the difference between quantities which are functions of the speed of the motor and the armature potential of the dynamo-electric machine.

3. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting the forcing generator and the field winding of the booster generator to the source of power in series circuit relation, means providing a first excitation for the forcing generator proportional to the speed of the motor, and means providing a second excitation for the forcing generator proportional to the armature potential of the dynamo-electric machine and in opposing relation with the said first excitation of the forcing generator.

4. In a control system for a dynamo-electric machine and a motor which is energized by a source of power of selectively variable potential, in combination, a booster generator, means connecting the dynamo-electric machine and the booster generator in series circuit relation to the source of power, a forcing generator, means connecting the forcing generator and the field winding of the booster generator to the source of power in series circuit relation, means providing a first excitation for the forcing generator proportional to the speed of the motor, and means providing a second excitation for the forcing generator in opposing relation to said first excitation for the forcing generator and comprising an excitation proportional to the armature potential of the dynamo-electric machine and an excitation proportional to the armature current of the dynamo-electric machine.

5. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator to the source of power in series circuit relation, a first field winding for the forcing generator, means energizing said first field winding with a potential proportional to the armature potential of the dynamo-electric machine, a second field winding for the forcing generator, means energizing said second field winding with a potential proportional to the armature current of the dynamo-electric machine, a third field winding for the forcing generator, and means energizing said third field winding with a potential proportional to the speed of the motor, the excitation provided by said third field winding being in opposed relation with the excitation provided by said first and second field windings.

6. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator to the source of power in series circuit relation, a first field winding for the forcing generator, means energizing said first field winding with a potential proportional to the armature potential of the dynamo-electric machine, a second field winding for said forcing generator, and means energizing said second field winding with a potential proportional to the speed of the motor, the excitations provided by said field windings being in opposing relation.

7. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator to the source of power in series circuit relation, a first field winding for the forcing generator, a pilot generator driven by the motor, means connecting said first field winding to be energized by the pilot generator, a second field winding for forcing generator, and means connecting said second field winding to be energized by the potential across the armature of the dynamo-electric machine, said first and second windings being in opposing relation.

8. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator in series circuit relation, means providing energization for the series circuit which comprises the forcing generator and the booster field winding which varies as a function of the speed of the motor, and means providing excitation for the forcing generator proportional to the difference between quantities which are functions of the speed of the motor and the armature potential of the dynamo-electric machine.

9. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator in series circuit relation, means providing energization for the series circuit which comprises the forcing generator and the booster field winding, which varies as a function of the speed of the motor, means providing a first excitation for the forcing generator proportional to the speed of the motor, and means providing a second excitation for the forcing generator proportional to the armature potential of the dynamo-electric machine and in opposing relation with the said first excitation of the forcing generator.

10. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator in series circuit relation, means providing energization for the series circuit which comprises the forcing generator and the booster field winding, which varies as a function of the speed of the motor, means providing a first excitation for the forcing generator proportional to the speed of the motor, and means providing a second excitation for the forcing generator in opposing relation to said first excitation for the forcing generator and comprising an excitation proportional to the armature potential of the dynamo-electric machine and an excitation proportional to the armature current of the dynamo-electric machine.

11. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator in series circuit relation, means providing energization for the series circuit which comprises the forcing generator and the booster field winding, which varies as a function of the speed of the motor, a first field winding for the forcing generator, means energizing said first field winding with a potential proportional to the armature potential of the dynamo-electric machine, a second field winding for the forcing generator, means energizing said second field winding with a potential proportional to the armature current of the dynamo-electric machine, a third field winding for the forcing generator, and means energizing said third field winding with a potential proportional to the speed of the motor, the excitation provided by said third field winding being in opposed relation with the excitation provided by said first and second field windings.

12. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator in series circuit relation, means providing energization for the series circuit which comprises the forcing generator and the booster field winding, which varies as a function of the speed of the motor, a first field winding for the forcing generator, means energizing said first field winding with a potential proportional to the armature potential of the dynamo-electric machine, a second field winding for the forcing generator, and means energizing said second field winding with a potential proportional to the speed of the motor, the excitations provided by said field windings being in opposing relation.

13. In a control system for a dynamo-electric machine and a motor which is energized by a source of power of selectively variable potential, in combination, a booster generator, means connecting the dynamo-electric machine and the booster generator in series circuit relation to the said source of power, a forcing generator, means connecting said forcing generator and the field winding of the booster generator in series circuit relation, means providing energization for the series circuit which comprises the forcing generator and the booster field winding, which varies as a function of the speed of the motor, a first field winding for the forcing generator, a pilot generator driven by the motor, means connecting said first field winding to be energized by the pilot generator, a second field winding for the forcing generator, means connecting said second field winding to be energized by the potential across the armature as a function of the speed of the motor, and means providing excitation for the forcing generator proportional to the difference between quantities which are functions of the speed of the motor and the armature potential of the dynamo-electric machine.

14. In a control system for a dynamo-electric machine and a motor which is energized by a source of power of selectively variable potential, in combination, a booster generator, means connecting the dynamo-electric machine and the booster generator in series circuit relation to the source of power, a forcing generator, a source of potential, means for varying the potential of the said source of potential in accordance with variations in the speed of the motor, means connecting the forcing generator and the field winding of the booster generator in series circuit relation to said source of potential, and means providing opposing excitations for the forcing generator proportional to the potential of the source of potential and the armature potential of the dynamo-electric machine respectively.

15. In a control system for a dynamo-electric machine and a motor which is energized by a source of power of selectively variable potential, in combination, a booster generator, means connecting the dynamo-electric machine and the booster generator in series circuit relation to the source of power, a forcing generator, a source of potential, means for varying the potential of said source of potential in accordance with variations in the speed of the motor, means connecting said forcing generator and the field winding of said booster generator in series circuit relation to said source of potential, means providing first and second excitations for the forcing generator proportional to the armature current and the armature potential, respectively, of the dynamo-electric machine, and means providing a third excitation for the forcing generator proportional to the potential of said source of potential and opposed to said first and second excitations.

16. In a control system for a dynamo-electric machine and a motor which is energized by a source of power of selectively variable potential, in combination, a booster generator, means connecting the dynamo-electric machine and the booster generator in series circuit relation to the said source of power, a forcing generator, a pilot generator driven by the motor and varying its potential in accordance with variations in the motor speed, means connecting the forcing generator, said pilot generator and the field winding of the booster generator in series circuit relation, and means providing opposing excitations for the forcing generator proportional to the potential of the pilot generator and the armature potential of the dynamo-electric machine, respectively.

17. In a control system for a dynamo-electric machine and a motor which is energized by a source of power of selectively variable potential, in combination, a booster generator, means connecting the dynamo-electric machine and the booster generator in series circuit relation to the source of power, a forcing generator, a pilot generator driven by the motor and varying its potential in accordance with variations in the motor speed, means connecting said forcing generator, said pilot generator and the field winding of the booster generator in series circuit relation, means providing first and second excitations for the forcing generator proportional to the armature current and armature potential, respectively, of the dynamo-electric machine, and means providing a third excitation for the forcing generator proportional to the potential of the pilot generator and opposed to said first and second excitations.

18. In a control system for a dynamo-electric machine and a motor which is energized by a source of power of selectively variable potential, in combination, a booster generator, means connecting the dynamo-electric machine and the booster generator in series circuit relation to the source of power, a forcing generator, means connecting said forcing generator and the field winding of the booster generator to the source of power in series circuit relation, means providing excitation for the forcing generator proportional to the difference between quantities which are functions of the speed of the motor and the armature potential of the dynamo-electric machine, and means for simultaneously varying the excitation of the motor and the booster generator.

19. In a control system for a dynamo-electric machine and a motor which is energized by a source of power of selectively variable potential, in combination, a booster generator, means connecting the dynamo-electric machine and the booster generator in series circuit relation to the source of power, a forcing generator, means connecting said forcing generator and the field winding of the booster generator to the source of power in series circuit relation, means providing a first excitation for the forcing generator proportional to the speed of the motor, and means providing a second excitation for the forcing generator in opposing relation to said first excitation for the forcing generator and comprising an excitation proportional to the armature potential of the dynamo-electric machine and an excitation proportional to the armature current of the dynamo-electric machine, and means for simultaneously varying the excitation of the motor and the booster generator.

WILLARD G. COOK.